United States Patent [19]

Cheng

[11] Patent Number: 4,933,791
[45] Date of Patent: Jun. 12, 1990

[54] HEAD ARM FLEXURE FOR DISC DRIVES

[75] Inventor: Chun-Jer C. Cheng, Saratoga, Calif.

[73] Assignee: Seagate Technology, Inc., Scotts Valley, Calif.

[21] Appl. No.: 220,547

[22] Filed: Jul. 18, 1988

[51] Int. Cl.⁵ .............................................. G11B 5/48
[52] U.S. Cl. ..................................... 360/104; 360/109
[58] Field of Search ........................ 360/104, 105–106, 360/109, 97.01, 98.01, 99.01

[56] References Cited

U.S. PATENT DOCUMENTS

| | | | |
|---|---|---|---|
| 4,408,238 | 10/1983 | Hearn | 360/104 |
| 4,739,430 | 4/1988 | Manzke et al. | 360/106 |
| 4,760,478 | 7/1988 | Pal et al. | 360/97.01 X |
| 4,819,094 | 4/1989 | Oberg | 360/104 |
| 4,843,503 | 6/1989 | Hazebrouck et al. | 360/106 |

FOREIGN PATENT DOCUMENTS

| | | | |
|---|---|---|---|
| 59-213066 | 12/1984 | Japan | 360/104 |
| 60-187977 | 9/1985 | Japan | 360/104 |

Primary Examiner—John H. Wolff
Attorney, Agent, or Firm—Flehr, Hohbach, Test, Albritton & Herbert

[57] ABSTRACT

An improved flexure for a disc drive having a rotary head positioning apparatus located within a housing for locating a plurality of magnetic read/write heads relative to recording media within the housing. The flexure is particularly suitable for carrying servo heads and has its primary torsional and lateral bending resonant frequencies above 2.8 Khz and 5.0 kHz respectively. The flexure includes a base portion coupled to the head positioner apparatus, a head portion for carrying the servo head, the head portion including stiffener wings, and a curved portion joining the base and head portions. An extended backplate riveted to the flexure provides additional stiffness to the flexure.

7 Claims, 4 Drawing Sheets

HEAD ARM FLEXURE FOR DISC DRIVES

The present invention relates generally to an improved head arm flexure for disc drives. More particularly, the present invention relates to a flexure structure having improved stiffness characteristics.

BACKGROUND OF THE INVENTION

Conventional Winchester type disc drives include a plurality of vertically aligned rotating information storage discs, each of which has at least one associated magnetic head that is adapted to transfer information between the 10 disc and an external computer system. Each head is carried by an elongated flexure arm. The flexure arms are vertically aligned and are each attached to a common head positioner assembly. The head positioner assembly is adapted to move the heads back and forth in unison across the face of the vertically aligned discs. The head positioner assembly may be either rotationally mounted, or may take the form of a carriage that is free to move back and forth along a single axis. In either case, the head positioner assembly is adapted to precisely position the heads relative to the magnetic discs.

Since the magnetic heads and flexure arms, as well as the information storage discs are vertically aligned, the positions of the heads relative to their associated information storage discs may be regulated by accurately tracking the position of a single one of the heads. The tracking head is generally referred to as the servo head and its associated flexure arm is known as the servo flexure. A disc controller is used to accurately position the heads using information that the servo head reads from its adjacent magnetic disc. It will be appreciated that one of the important characteristics of a disc drive is the average speed at which it can access information on the discs. Therefore, the controller that drives the head positioner assembly must have a rapid response. This is accomplished by utilizing feedback control from the servo head with a relatively large gain.

In disc drives that incorporate rotationally mounted head positioner assemblies, the heads and flexure arms undergo rapid angular acceleration and deceleration as they move back and forth across the discs. Conventional flexures have several drawbacks, one of which is that they are relatively flexible laterally and torsionally. When the head positioner assembly is moved very quickly, the resonant frequencies of the flexures are frequently stimulated causing the heads to oscillate back and forth. Such resonant oscillations limit the speed at which information can be retrieved since the computer must wait until the oscillations are damped before reading information from or writing information onto the disc. These resonance problems are particularly troublesome when they occur in the servo flexure since the feedback controller that regulates the position of the head positioner assembly will be provided with incorrect information as to the position of the heads and thus will tend to over or under compensate for the actual head position. Therefor, the resonance problems tend to reduce the effectiveness of a tight controller and slow down the overall disc access speed.

SUMMARY OF THE INVENTION

Accordingly, it is a primary objective of the present invention to provide a stiffer flexure construction that reduces or eliminates flexure resonance problems in modern disc drives assemblies.

To achieve the foregoing and other objects and in accordance with the purpose of the present invention, an improved flexure is provided that has its primary torsional and lateral bending resonant frequencies above 2.8 kHz and 5.0 kHz respectively. The flexure is particularly useful for disc drives having a rotary head positioning apparatus located within a housing for locating one or more magnetic read/write heads relative to recording media within the housing. The flexure is particularly suitable for carrying servo heads. The flexure includes a base portion coupled to the head positioner apparatus, a head portion for carrying the servo head, the head portion including stiffener wings, and a curved portion joining the base and head portions.

In a preferred embodiment, an extended backplate is welded to the base portion of the flexure to provide additional stiffness. The backplate extends substantially the entire length of the flexures base portion. The base portion covers at least a third of the overall length of the flexure.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
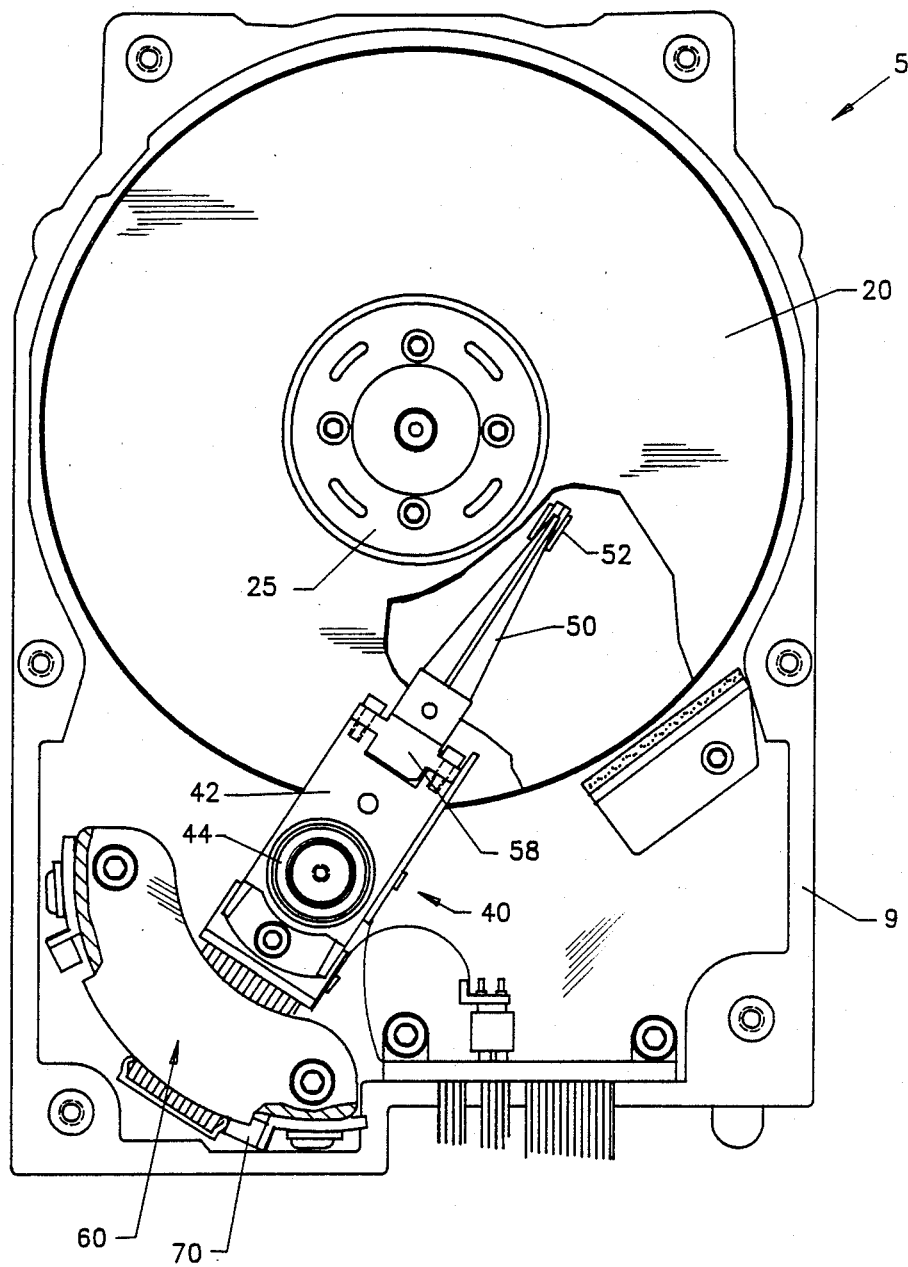
FIG. 1 is a diagrammatic top view of a disc drive that incorporates the present invention with its upper casing removed.
Figure 2:
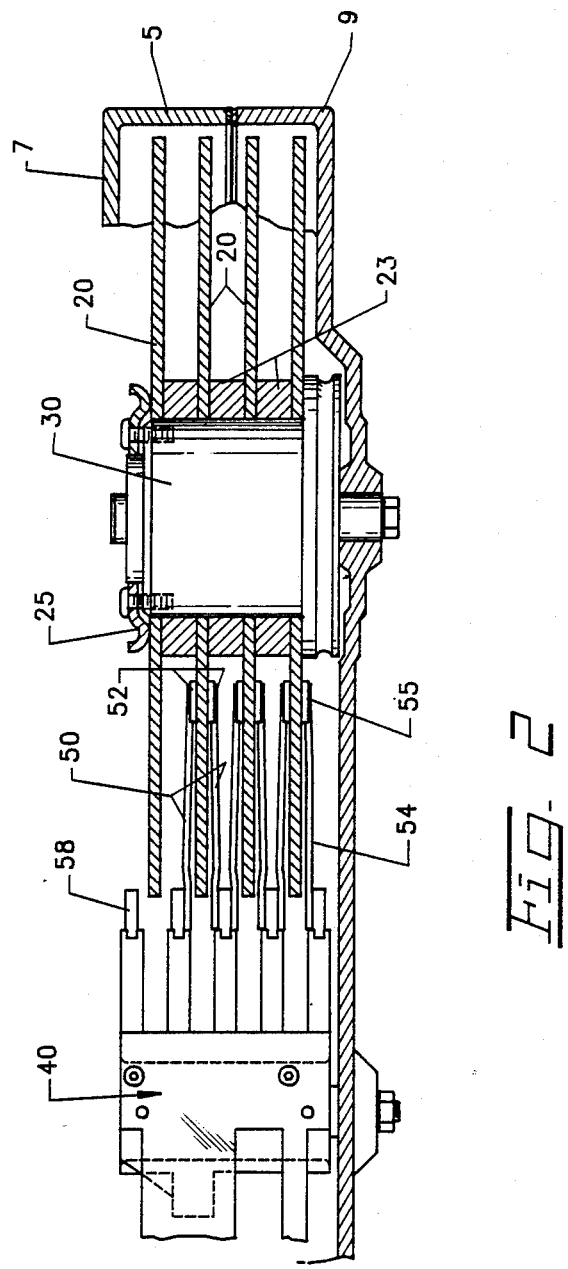
FIG. 2 is a diagrammatic side view of the disc drive shown in FIG. 1.

Referring first to FIGS. 1 and 2, a rotary disc drive system suitable for incorporating the teaching of the present invention is shown in diagrammatic form. A plurality of magnetic information storage discs 20 are journaled about a spindle motor assembly 30 within a housing 5 having upper and lower casing members 7 and 9 respectively. Each magnetic disc 20 has a multiplicity of concentric circular information storage tracks for recording information. A head positioner assembly 40 is rotatably mounted between the upper and lower casings 7,9 in one corner of the housing 5. The head positioner assembly 40 carries a plurality of head arm flexures 50 that each carry a magnetic head 52 for reading information from and writing information onto the magnetic discs 20. The head positioner assembly 40 also carries a servo arm 54 which carries a servo head 55 for accurately positioning the magnetic heads 52 relative to the information storage tracks. The head and servo arms are each attached to the head positioner assembly 40 by individual flexure mounts 58. A voice coil motor 60 is adapted to precisely rotate the head positioner assembly back and forth such that the magnetic and servo heads move across the magnetic discs. A magnetic latch 70 holds the head positioner assembly in place when the disc drive is not in use.

Figure 3:
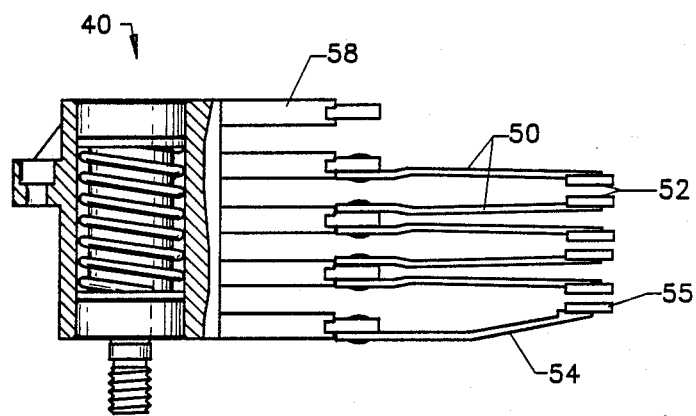
FIG. 3 a diagrammatic side view of a head positioner assembly incorporating the servo flexure of the present invention.

Referring next to FIG. 3, it will be apparent that the servo arm 54 is vertically aligned with the head arm flexures 50. All of the flexures are mounted to the head positioner assembly in the same manner. When the head positioner assembly rotates, the vertically aligned data head and servo head arms 50,54, pass in unison over the information storage tracks on their adjacent magnetic discs 20. Therefore, the position of the heads 52 relative to their associated magnetic discs 20 may be regulated by accurately tracking the position of a single one of the heads (i.e. the servo head). The servo head is used count the information storage tracks it passes over as the head positioner assembly 40 rotates back and forth. The track information read by the servo head provides feedback to a controller (not shown) to facilitate precisely positioning the heads. The controller drives the voice coil motor 60 which rotates the head arm positioner assembly.

It is generally desirable to have very short disc access times and thus, the controller must have a rapid response. Rapid movements of the rotationally mounted head positioner assembly 40 causes the heads and flexure arms undergo rapid angular acceleration and deceleration as they move back and forth across the discs. Conventional flexures have several drawbacks, one of which is that they are relatively flexible laterally and torsionally. This can cause problems in high speed disc drive systems since resonant frequencies within the flexures may be inadvertently excited as the heads are moved back and forth between various information storage tracks. Such resonant behavior both bends the flexures and creates oscillation therein that limit the speed at which information can be retrieved since the oscillations must be fully damped before reading information from or writing information onto the disc.

Resonance problems are particularly troublesome when they occur in the servo flexure since the feedback controller that regulates the position of the head positioner assembly will be provided with incorrect information as to the position of the heads and thus will tend to over or under compensate for the actual head position. Therefor, the resonance problems reduce the effectiveness of a tight controller and slow the overall disc access speed.

Conventional flexures for 3½ inch Winchester type disc drives tend to have first order lateral bending resonance frequency characteristic in the neighborhood of 2.8 kHz. Torsional first order resonance frequencies tend to be in the neighborhood of 2.2 kHz. Although such flexures work reasonably for relatively slow access drives, newer high speed drives operated at speeds which occasionally excite such resonant frequencies. By way of example, a 3½ inch disc drive having a 20 millisecond access time for a head movement equivalent to one-third of the head arms stroke (about one quarter of an inch), will tend to excite the aforementioned resonant frequencies during some operations. The resonant frequencies stimulated typically do not cause problems for the head arm flexures since damping is rapid and they are fully damped before the disc drive is prepared to access the magnetic discs. However, such bending and oscillations do create problems for the controller which positions the head arms. Therefore, a servo arm flexure has been designed that does not have first or second order torsional or lateral bending resonant frequencies that will be stimulated during movements of the head positioner assembly.

It should be appreciated that the servo arm flexure 54 may be constructed differently than the head arm flexures 50. Obviously, the servo flexure construction described can readily be used for the data head flexures 50 as well. Using a common design for the data head arm flexures 50 and the servo arm flexure 54 is advantageous from the production standpoint and facilitates still higher disc access speed in certain situations, as described below.

Figure 4:
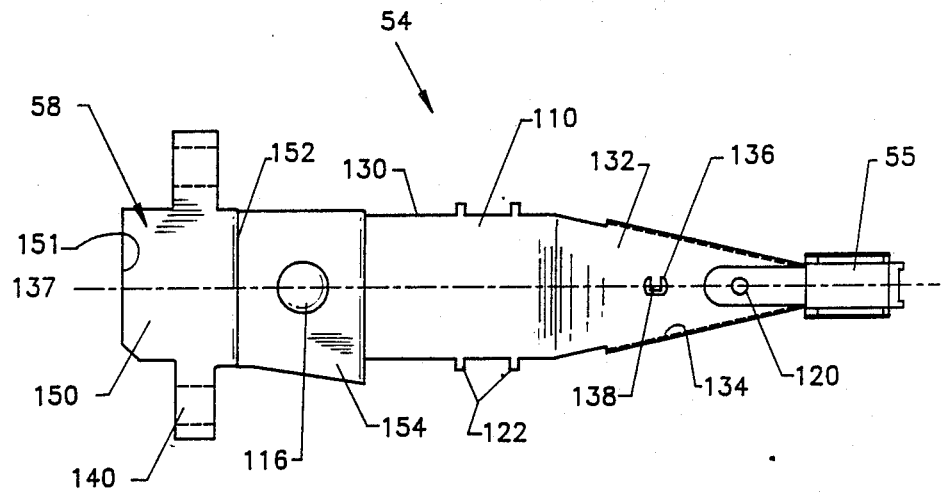
FIG. 4 is a top view of a servo flexure constructed in accordance with the present invention.
Figure 5:
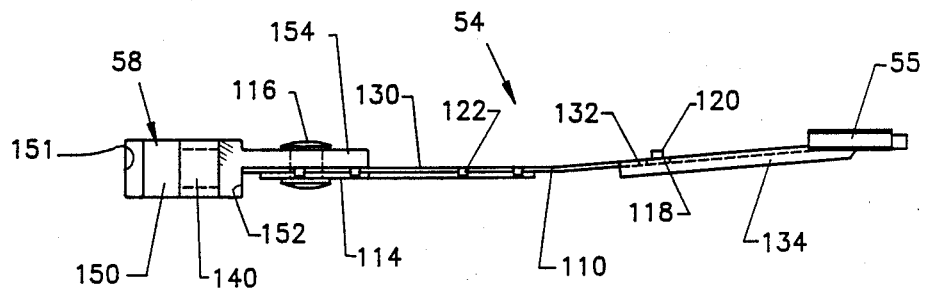
FIG. 5 is a side view of the servo flexure shown in FIG. 4.

The embodiment of the improved servo flexure arm chosen for the purpose of illustration is shown in FIGS. 4 and 5. Servo arm 54 includes an elongated flexure 110 that is welded to the mount plate 114, which is coupled to the head positioner assembly 40 by a rivet 116 through an opening aligned in flexure 110 and backing plate 114. An electrical wire (not shown) suitable for transmitting electrical signals to and from the servo head 55 is held on the flexure 110 by the clips 122. The servo flexure is designed to eliminate the first lateral bending resonant frequencies below 5.0 kHz.

Elongated flexure 110 is formed from a single etched metallic part that has a substantially rectangular base portion 130 and a substantially trapezoidal head portion 132 as can be best seen in FIG. 4. The region between base portion 130 and head portion 132 takes the form of an extended continuously curved section and is arranged such that the head portion 132 extends slightly upwardly from the base portion 130. In a preferred embodiment of the invention, the base portion 130 extends at least one third of the entire length of the flexure.

A pair of stiffening wings 134 extend downward to form the edges of a head portion 132 to provide additional lateral and torsional bending support. The head portion 132 also includes an internal clip opening 136 that is punched about the flexures lateral centerline 137 to form a clip 138 suitable for holding the electrical wire. The region 200 between base portion 130 and head portion 132 takes the form of an extended curved section. There are no tabs or wings present in the curved section of the elongated flexure.

Circular opening 118 is also punched into the head portion of elongated flexure 110 along the lateral centerline 137. The servo head 55 is secured to elongated flexure 110 in a conventional manner through a flexible gimbal section as well. The electrical connections between servo head 55 and the controller may be conventional as well.

The base portion 130 has a plurality of narrow bendable clips 122 for securing the electrical wire to the servo flexure. The elongated flexure 110 is riveted to the flexure mount 58 which in turn is coupled to head positioner assembly 40. The flexure mount 58 may take a wide variety of forms. The flexure mount 58 shown chosen for the purposes of illustration looks somewhat like a compressed "t", as seen in FIGS. 3–5 and includes screwholes 140 in each of its arms. The servo arm 54 may then be attached to the head positioner assembly 40 by a pair of screws. A suitable construction for the flexure mount 58 is described in co-pending application Ser. No. 220553, filed July 18, 1988, which is incorporated herein by reference.

Referring next to FIGS. 4 and 5, the flexure mount 58 has a base 150 having a flat proximal surface 151 adapted to engage the head positioner assembly. Flexure support pad, which is narrower than base 150 extend distally from the distal surface 152 of base 150. Flexure support pad 154 has a polygonal shape and includes a borehole adapted to receive rivet 116. The top and bottom surfaces 155 of support pad 154 are flat and either may engage elongated flexure 110 when the servo arm is put together.

A rectangular backing plate 114, is riveted to the flexure support pad 154 of flexure mount 58 by rivet 116 with elongated flexure 110 sandwiched in between. The proximal end of backing plate 114 is spaced apart in front of the distal surface 152 on base 150. The backing plate 114 is placed against the bottom surface of base portion 130 of elongated flexure 110 substantially the entire length of the base portion. The purpose for the extended backing plate 114 is to stiffen the flexure, thereby increasing its torsional and lateral bending resonant frequencies. In the embodiment shown, the backing plate is attached to the flexure in only one position (i.e. by rivet 116). Such a construction facilitates efficient construction of the servo arm 54, although it should be appreciated that multiple attachment points could be used as well.

It should be appreciated, that in an alternative construction, the flexure support pad 154 on flexure mount 58 could be extended outward along the base portion 130 of elongated flexure 110 to accomplish the same stiffening function. In such a construction the backing plate 114 may be any size.

The flexure 110 may be made from a wide variety of materials, although stainless steel in known to work well. The backing plate 114 is preferably made from the same material as the flexure 110 to minimize thermal expansion problems, although this is not a requirement. The flexure mount 58 is typically fabricated from the same material as the head positioner assembly. By way of example a suitable material for the flexure mount is aluminum.

Keeping the general design described above in mind, it should be apparent that a finite element analysis of the servo flexure may be performed to insure that a flexure having the described torsional and lateral bending resonant frequencies is provided. Additional rigidity can be provided by extending the length of backing plate 114 or extending the flexure support pad 154 of flexure mount 58 to cover a greater portion of one or both sides of the elongated flexure 110. Similarly, additional rigidity can be provided by enhancing the size of stiffener wings 134 or otherwise varying the dimensions of particular components. In the embodiment chosen for the purposes of illustration, the primary torsional and lateral bending resonant frequencies are designed to exceed 2.8 kHz and 5.0 kHz respectively.

In the event that even faster disc drives are developed, it may be desirable to provide servo flexures having even higher first order torsional and lateral bending resonant frequencies. It should be apparent that the first order frequencies that a servo flexure can reasonably be expected to experience in starting and stopping the movements of a rotatable head positioner assembly in a given design can readily be calculated by determining the accelerations and decelerations expected in starting and stopping movements of the head positioner assembly. The servo flexure may then be designed to avoid first order resonant frequencies within the range of concern by stiffening the servo flexure in accordance with the design approach described above.

It will be appreciated by those skilled in the art that standard techniques may be used to make computer models of the flexure structures to facilitate analyzing the resonant frequencies of specific flexure structures. After an accurate model of the flexure structure is obtained, the length of the backing plate 114 and/or the head adapter 114, the length and width of stiffener wings 134 the placement of the curved section that separates the base portion 130 from the head portion 132, as well as more minor features may readily be varied to alter the stiffness, and thus resonant frequencies of the flexure. Finite element analysis of potential designs accommodates an interactive design approach which will allow the development of a suitable servo flexure.

Although only a few embodiments of the present invention have been described herein, it should be understood that the present invention may be embodied in many other specific forms without departing from the spirit or scope of the invention. Particularly, it should be appreciated that the actual dimensions of the backing plate, the stiffener wings as well as the other described components may readily be varied within the scope of the present invention. Further the placement of the bend between the base and head portions of the elongated flexure may be widely varied.

It should also be appreciated that although the invention has been described as applied to servo heads, in high speed disc drive applications, the activation of resonant frequencies within the data head arm flexures may also become a concern. This is particularly true in systems wherein the conventional flexures would not adequately damp potentially active resonant frequencies before the disc drive is prepared to transfer data to or from the disc. Therefore, the present examples and embodiments are to be considered as illustrative and not restrictive, and the invention is not to be limited to the details given herein, but may be modified within the scope of the appended claims.

I claim:

1. In a disc drive having a head positioning apparatus located within a housing for positioning magnetic head transducers relative to a recording medium within the housing, the improvement comprising:
    a flexure for carrying the transducer, the flexure having a primary torsional resonant frequency of above 2.8 kHz and a primary lateral resonant frequency of above 5.9 kHz.

2. A disc drive having an information storage disc a transducer head for accessing the information storage disc and head positioning means for positioning the transducer head relative to the information storage disc, the head positioning apparatus including a rotary head positioner assembly that is rotatably coupled to the housing, an elongated flexure that carries the transducer head, and attachment means for coupling the flexure to the head positioner assembly, the flexure comprising:
    a base portion coupled to said attachment means;
    a head portion for carrying said transducers head, said head portion including stiffener wings extending substantially the entire length of the head portion;
    a curved portion joining said base and head portions such that said base portion and said head portion do not lie in the same plane;
    a back plate coupled to the base portion of the flexure for stiffening the flexure;
    wherein said base portion extends at least one third of the entire length of the flexure and said back plate extends substantially the entire length of the base portion.

3. A disc drive as recited in claim 2 further comprising a plurality of vertically aligned information storage discs, wherein said rotary head positioning apparatus carries a plurality of vertically aligned read/write data heads and said transducer head is a servo head for directing a controller to position the data heads relative to the information storage discs.

4. A disc drive as recited in claim 2 wherein said backplate is formed from the same material as said flexure.

5. A disc drive as recited in claim 2 wherein the flexure has a primary lateral bending resonant frequency of greater than 5.0 kHz.

6. A disc drive as recited in claim 5 wherein the flexure has a primary torsional resonant frequency of above 2.8 kHz.

7. A disc drive as recited in claim 6 wherein said back plate is formed from the same material as the flexure.

* * * * *